UNITED STATES PATENT OFFICE.

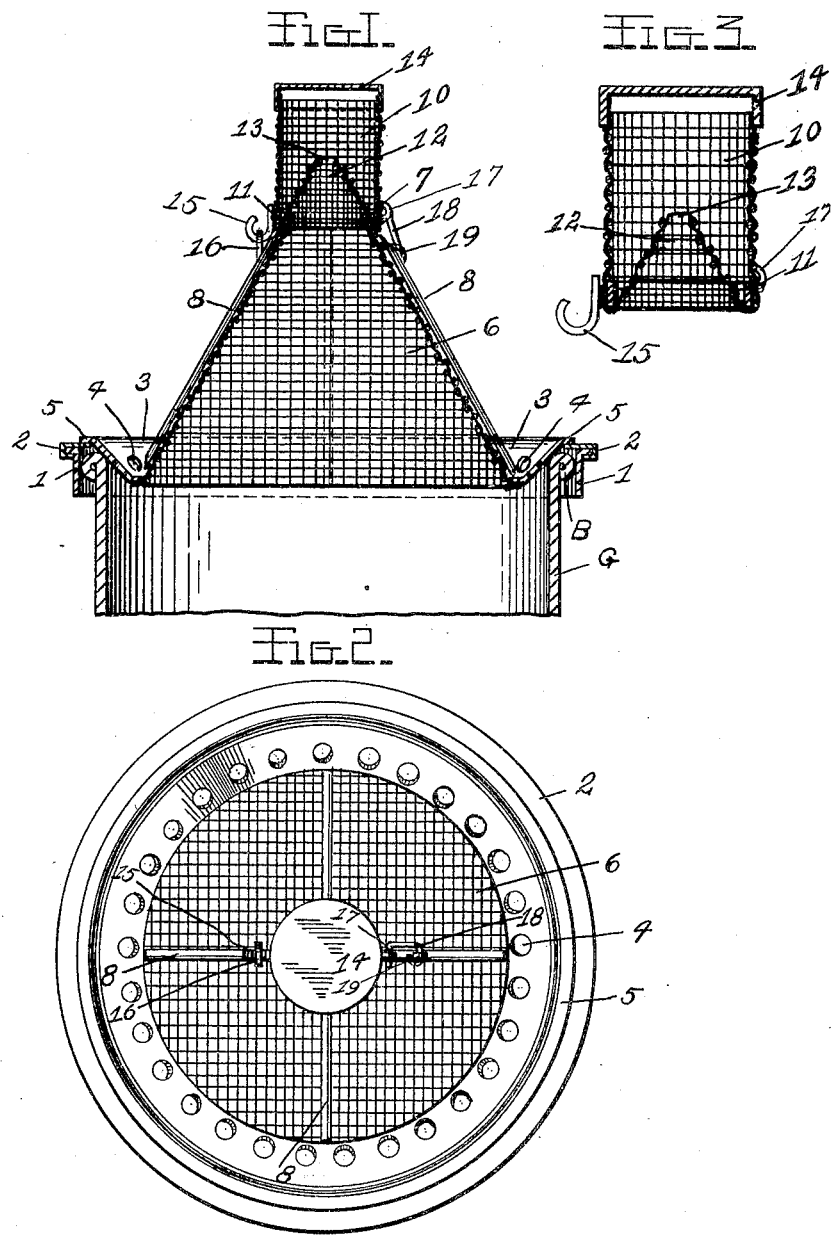
J. E. LOUDON.
FLY TRAP.
APPLICATION FILED JUNE 5, 1913.
1,084,020.
Patented Jan. 13, 1914.
Inventor
J. E. Loudon

JOHN E. LOUDON, OF EVERETT, WASHINGTON.

FLY-TRAP.

1,084,020.   Specification of Letters Patent.   Patented Jan. 13, 1914.

Application filed June 5, 1913. Serial No. 771,987.

*To all whom it may concern:*

Be it known that I, JOHN E. LOUDON, a citizen of the United States, residing at Everett, in the county of Snohomish and State of Washington, have invented certain new and useful Improvements in Fly-Traps; and I do declare the following to be a full, clear, and exact description of the invention, such as will enable others skilled in the art to which it appertains to make and use the same.

This invention relates to fly traps, and more especially it is a trap of that character which is intended to catch the flies or other insects alive; and the object of the same is to produce a trap which may itself be set over the open end of a garbage can or other article if the trap is of small size, or may be located in an opening through the roof if the trap be of a large size.

The object of the invention is to simplify and yet improve the construction of such a trap and utilize the well known tendency of flies and insects to crawl upward toward the light. When they do so within this trap they are caught in a cage which is rendered removable from the body of the trap so that the insects may be burned, drowned, or otherwise destroyed, after which the cage is returned to its place; and even without the cage the use of this trap will strip a receptacle or a room of flies as will be shown below.

The following specification describes my preferred manner of carrying out the invention, as shown in the drawings wherein—

Figure 1 is a vertical section of this trap with its cage in place. Fig. 2 is a plan view thereof. Fig. 3 is an enlarged central vertical section of the cage removed.

In the drawings I have indicated in Fig. 1 at G the upper edge of a garbage can or other receptacle, preferably having a bead B around it as shown, but it is to be understood that my improved trap may be used with any similar receptacle or support and I have illustrated a garbage can as one such article wherein flies often accumulate. It will be understood without further illustration that if this trap were made on a large scale it might be suspended in an opening in a roof or might rest on the latter over the opening. For instance, flies frequently accumulate in hog pens, stables, chicken houses, and the like, or in kitchens, lunch-rooms and in other places where there is something to attract them. If the roof of these apartments have openings it is clear that traps of this kind could be set over them; if not, the trap might be suspended at a high point within the apartment, although preferably at some point where the upper side of the trap will be light for a purpose to appear below.

Coming now to the details of construction of the trap itself, the base consists of an upright band 1 preferably turned outward at its upper edge into a flange 2, and a conical or flaring member 3 pierced with holes 4 and having its upper edge 5 carried outward over said flange 2 and secured thereon as by solder or otherwise. The trap body 6 is a cone-shaped member of fly screening as shown, with its larger lower end secured around the inner edge of the member 3 and its smaller upper end protected by a metal strip 7 in the shape of a truncated cone, wires or rods 8 extending from this strip downward over the outer side of the body 6 and being secured to the member 3 as by soldering or otherwise.

The cage member of this improved trap, as best seen in Fig. 3, comprises a cylindrical body 10 having a reinforcing band 11 around its open lower end, a small cone 12 rising from said band within the body and open at its upper end as at 13, the body and the cone both being of wire screening and the upper end of the former being open, and a cover 14 removably closing said upper end. At one side of this cage is a hook 15 detachably engaging an eye 16 on the trap, preferably carried by one of said rods 8; and on the other side of the cage is an eye 17 into which is loosely linked a hook 18 adapted to engage another eye 19 on the diametrically opposite rod 8. This or any equivalent means may be provided for detachably connecting the cage with the trap as seen in Fig. 1, and the proportions and dimensions of the cage are such that the open upper end of the trap will project into the cage for some little distance as therein indicated.

With the parts constructed as described, they are assembled as best seen in Figs. 1 and 2 and the groove at the under side of the base passed over the open upper edge of some receptacle G such as a garbage can. The flies therein seeing light through the screen 6 pass upward into it, crawl through its open top into the cage body 10, and are trapped therein, and from time to time the entire cage is disconnected from the trap body, the flies burned or drowned, the cover 14 taken off and the carcasses thrown out, and the cover replaced and the cage reattached upon the trap. Flies or other insects within the receptacle G—or within a room if this device be used therein—will hardly crawl upward through the holes 4 in the sheet metal member 3 because the channel produced by this member and the band 1 is darker than the space within the trap body 6, and this is especially true if the trap be placed over a receptacle such as that indicated at G. Nevertheless flies which may light on the exterior of the trap and are attracted downward by the odors within the can G, might crawl through said holes, after which they will be trapped like the others above described. I do not wish to be limited to the materials or proportions of parts, and changes in details may be made as consistent with the following claims.

While I have spoken throughout this specification of a conical body and a cylindrical cage, and have so shown the elements in the drawings, it will be clear that if the garbage can G or other receptacle is of different shape such as oblong, square, rectangular, etc., the base of the body will be modified to correspond therewith.

What is claimed as new is:

1. In a fly trap, the combination with a channeled base having holes, a trap body of screen wire formed in the shape of a truncated cone and with its open lower end secured to said base, and eyes carried by said body near its open upper end; of a cage of screen wire of a size to surround the upper end of said trap body, a truncated cone also of screen wire secured within the cage-body, a reinforcing strip around the lower ends of said truncated cone and the body of the cage, a cover removably closing the upper end of said body, and fastening devices on the latter detachably engaging the eyes on the trap body, for the purpose set forth.

2. The combination with an open-topped receptacle; of a metallic band surrounding the upper edge of the same and flanged outward, a conical member of sheet metal standing inside the mouth of said receptacle and having holes through its body and its upper edge carried over and secured to the flange of said band, a trap body in the shape of a truncated cone of screen wire secured at its lower end to said member and rising therefrom, a reinforcing metallic band around its open upper end, and brace-rods connecting this band with said conical member; and a cage removably inclosing the open upper end of the trap, for the purpose set forth.

In testimony whereof I have hereunto set my hand in presence of two subscribing witnesses.

JOHN E. LOUDON.

Witnesses:
F. E. ANDERSON,
EMMA FOSSUM.

---

Copies of this patent may be obtained for five cents each, by addressing the "Commissioner of Patents, Washington, D. C."